United States Patent [19]

Moriwake

[11] Patent Number: 5,657,094

[45] Date of Patent: Aug. 12, 1997

[54] VIDEO SIGNAL PROCESSING METHOD AND APPARATUS EMPLOYING LUMINANCE AND CHROMA ESTIMATES

[75] Inventor: Katsuakira Moriwake, Kanagawa, Japan

[73] Assignee: Sony Corporation, Tokyo, Japan

[21] Appl. No.: 520,605

[22] Filed: Aug. 29, 1995

[30] Foreign Application Priority Data

Aug. 31, 1994 [JP] Japan ................................. 6-207556

[51] Int. Cl.⁶ .............................. H04N 9/74; H04N 9/77
[52] U.S. Cl. ......................... 348/578; 348/708; 348/712; 348/713
[58] Field of Search ................................. 348/578, 182, 348/571, 708, 712, 713; H04N 9/74, 9/64, 9/77

[56] References Cited

U.S. PATENT DOCUMENTS 4,635,101  1/1987  Nakayama ................ 348/708
5,208,662  5/1993  Song ...................... 348/713

FOREIGN PATENT DOCUMENTS 2 258 784   2/1993   United Kingdom .

Primary Examiner—Sherrie Hsia
Attorney, Agent, or Firm—William S. Frommer; Alvin Sinderbrand

[57] ABSTRACT

A video signal processing apparatus for separating a video input into a luminance signal and a chroma signal which are sent respectively for individualized special effect processing. Special effect signals are fed to a control unit. The levels of a luminance signal and a chroma signal having undergone the special effect processing are estimated by a program. Based on the result of the estimate, a limiter controls the gains of the chroma signal following the special effect processing. In this setup, the gains of the chroma signal are controlled so that the level of a composite video signal will fall within a predetermined range of levels in keeping with the contents of the special effect processing performed on the luminance signal and chroma signal.

6 Claims, 7 Drawing Sheets

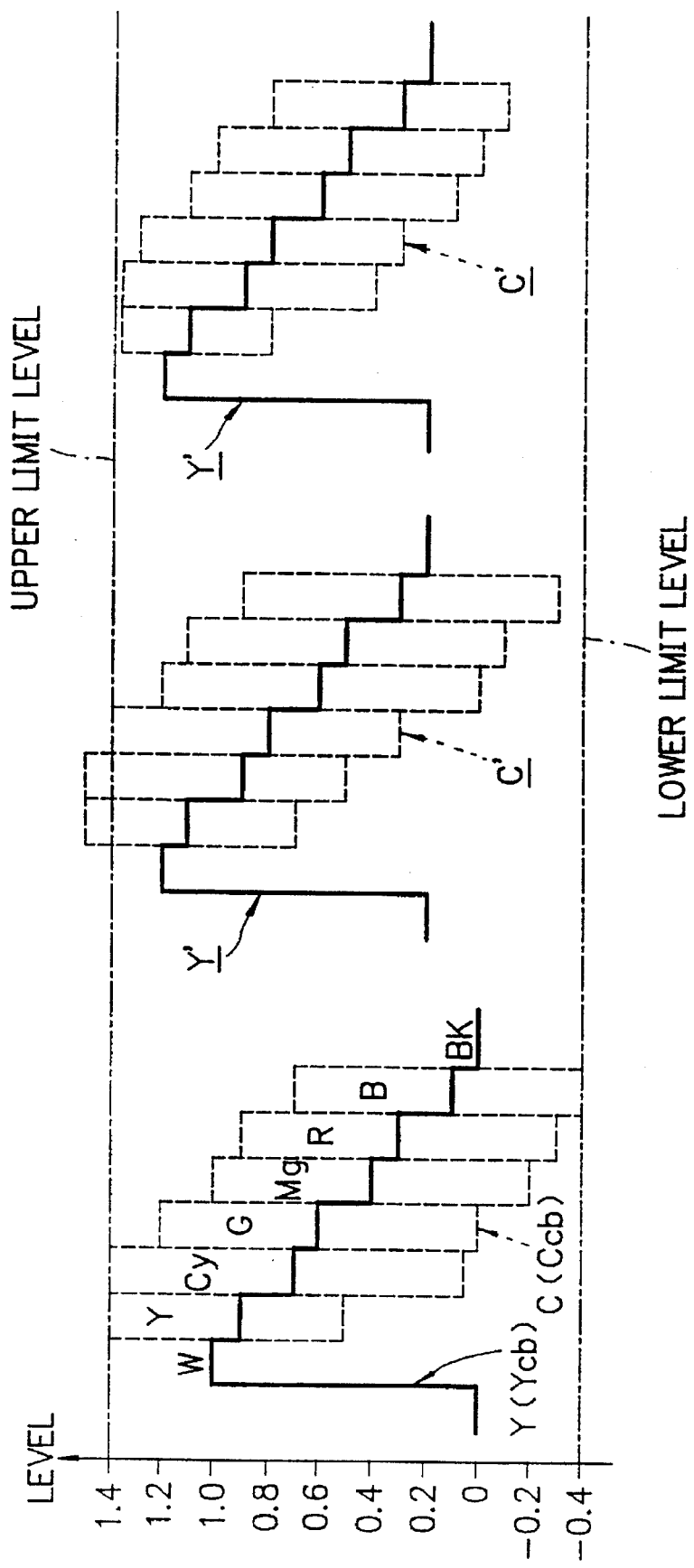

VIDEO SIGNAL PROCESSING METHOD AND APPARATUS EMPLOYING LUMINANCE AND CHROMA ESTIMATES

BACKGROUND OF THE INVENTION

The present invention relates to a video signal processing apparatus that may be applied to business-use video editing equipment.

Business-use video editing equipment (digital multi-effector) includes a special effect processing feature that allows luminance and chroma information in a video signal to be controlled as desired in accordance with the objective in video editing.

FIG. 10 is a schematic flow diagram of a conventional video signal processing apparatus with the special effect processing feature. In FIG. 10, a terminal 12 receives a digitized luminance signal Y that is fed to a luminance signal special effect processing circuit (Y-dedicated effect processing circuit) 14 for special effect processing. A special effect signal generator, not shown, generates a special effect signal for use with the luminance signal. This special effect signal (such as a posterization signal) is supplied to the processing circuit 14.

A terminal 16 receives a digitized chroma signal C that is converted by a color difference signal generation circuit 18 into color difference signals (R–Y) and (B–Y). The color difference signals are then fed to a chroma signal special effect processing circuit (C-dedicated effect processing circuit) 20 for special effect processing. The above-mentioned special effect signal generator generates another special effect signal for use with the chroma signal. The luminance signal Y and chroma signal C having undergone the special effect processing are combined by a composition circuit 22 into a composite video signal.

Where the special effect processing is carried out, the level of the composite video signal must meet relevant broadcast requirements. For example, suppose that the luminance signal Y and chroma signal C are subjected to the special effect processing and that the levels of the two signals fall within their respective predetermined ranges, as shown in FIG. 11A. In that case, combining the two signals after the processing can cause part of the processed chroma signal C' to exceed the upper limit of the broadcast requirements. Conversely, the processed chroma signal C' can drop below its lower limit depending on the special effect processing performed on the luminance signal Y.

A chroma signal C' having exceeded its upper limit level will have a distorted phase. This can lead to the generation of what is known as illegal colors. The phenomenon is conventionally suppressed by a limiter 28 installed as depicted in FIG. 10.

The luminance signal Y' and chroma signal C' having undergone the special effect processing are led into an adder 24 for signal composition. The composite video signal from the adder 24 is supplied to a control unit 26. The control unit 26 checks to see if the level of the composite video signal falls within a permissible range of relevant broadcast requirements. If the composite video signal is found to exceed its upper or lower limit, the control unit 28 effects an output to control the limiter 28 so as to limit the level of either the luminance signal Y' or the chroma signal C'. Illustratively, the gain of the chroma signal C' may be controlled for the composite video signal to meet the broadcast requirements shown in FIG. 11C.

As outlined, the conventional measures for illegal color prevention involve actually producing the composite video signal from the luminance signal Y' and chroma signal C' and then operating the control unit 28 in accordance with the produced composite signal. This translates into a bulky scale of hardware for the control unit 26.

OBJECT AND SUMMARY OF THE INVENTION

It is therefore an object of the present invention to overcome the above problems and to provide a video signal processing apparatus having a control unit of a reduced scale of hardware.

In one aspect of the present invention, in the video signal processing apparatus, a luminance signal processing means processes a luminance signal of a video signal, and a color signal processing means processes a color signal of the video signal. A control signal generation means generates a control signal in order to control the luminance signal processing means and the color signal processing means. A level control means controls the level of the color signal processed by the color signal processing means. A control means receiving the control signal, estimates signal levels of the luminance signal and the color signal which are processed by the luminance signal processing means and the color signal processing means, based on the control signal, and controls the level control means, based on the estimated signal level.

As shown in FIG. 1, special effect signals Ye and Ce generated by a special effect signal generation circuit 30 are supplied to special effect processing circuits 14 and 20, respectively. The signals Ye and Ce are also sent to a control unit 34 comprising a microcomputer. Given the signals Ye and Ce, the control unit 34 estimates after the special effect processing a luminance signal Y' and a chroma signal C' based on the luminance signal and chroma signal constituting a 100% color bar signal.

The control unit 34 then checks by estimate to see if the level of the composite video signal made of the estimated luminance signal Y' and chroma signal C' falls within a predetermined range of broadcast requirements. If a signal level limit is exceeded and illegal colors are liable to occur, the gain of the chroma signal C' is suitably adjusted.

As outlined, the estimate check is made with a program and using the special effect signals Ye and Ce to see if the signal level requirements are met. This translates into a significantly reduced scope of necessary hardware for the control unit 34.

Additional objects and advantages of the present invention will be apparent from the following detailed description of a preferred embodiment thereof, which is best understood with reference to the accompanying drawings.

BRIEF DESCRIPTION OF THE DRAWINGS

FIGS. 11A, 11B and 11C are views illustrating how illegal colors can develop.

DESCRIPTION OF THE PREFERRED EMBODIMENT

A video signal processing apparatus practiced as one preferred embodiment of the invention and applied to digital video editing equipment will now be described in detail with reference to the accompanying drawings.

Figure 1:
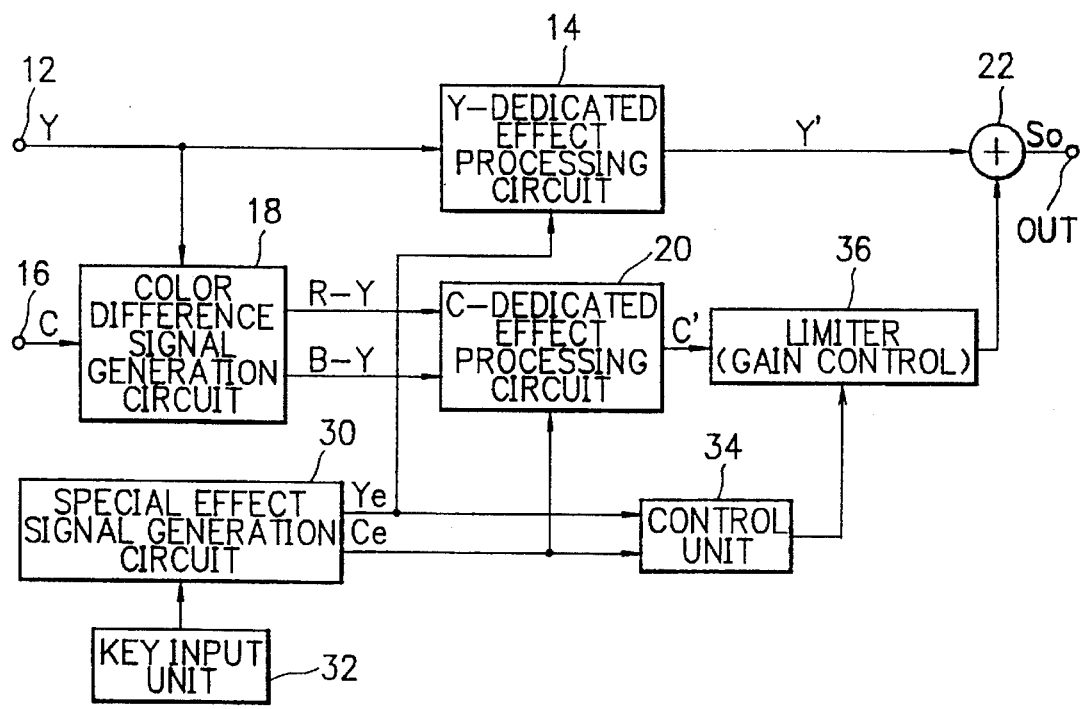
FIG. 1 is a schematic flow diagram of a typical video signal processing apparatus embodying the invention.
Figure 10:
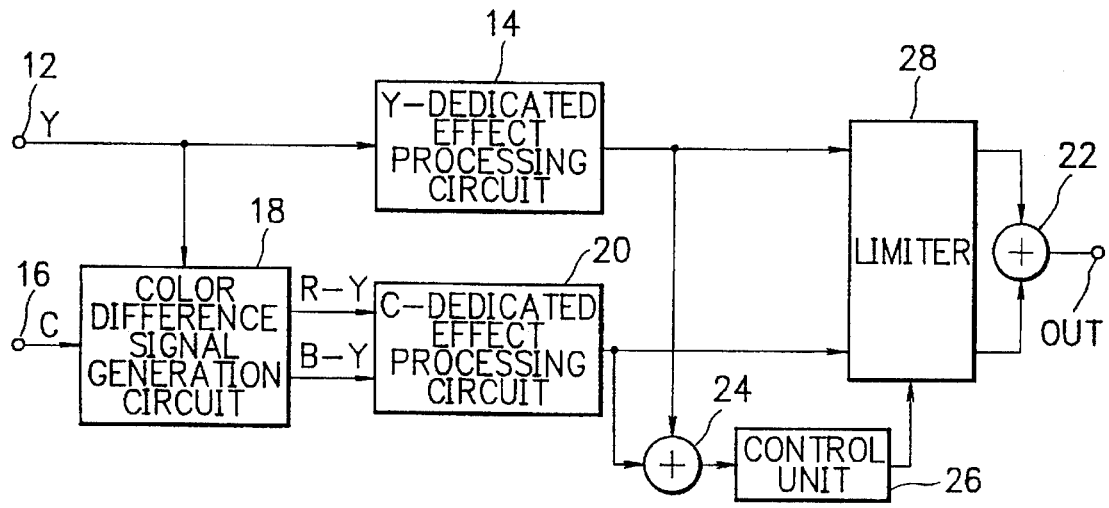
FIG. 10 is a schematic flow diagram of a conventional video signal processing apparatus.

FIG. 1 is a schematic flow diagram of the video signal processing apparatus 10 embodying the invention. The basic constitution of the special effect processing section in FIG. 1 is virtually identical to that in FIG. 10. The luminance signal Y and chroma signal C (in the form of color difference signals in FIG. 1) are fed to the special effect processing circuits 14 and 20, respectively, for individualized special effect processing. While the processed signals are usually combined for output, they may be output uncombined if desired.

The chroma signal C is converted provisionally into color difference signals (R–Y) and (B–Y). The color difference signals are subjected to special effect processes such as hue adjustment of the corresponding color signals (primary color signals, complementary color signals, etc.).

The special effect signal generation circuit 30 outputs the special effect signals Ye and Ce, which are used for control of the special effect processing circuits 14 and 20. The special effect signals Ye and Ce is generated in accordance with an input from a key input unit 32.

The control unit 34 incorporating a microcomputer receives the special effect signals Ye and Ce, and estimates the level of a composite video signal So following the special effect processing on the assumption that the luminance signal Y and chroma signal C constituting a 100% color bar signal have been inputted at terminals 12 and 16. If the estimated level exceeds a predetermined range of requirements, the gain of the chroma signal C' is controlled by a limiter 36 so that the estimated signal level will fall back within the predetermined range. Thus the limiter 36 functions as a gain control circuit.

The luminance signal Y' and chroma signal C' following the special effect processing are calculated in accordance with the luminance signal Y and chroma signal C constituting the color bar signal (see FIG. 11A) and the special effect signals Ye and Ce by the control unit 34. The special effect signals Ye and Ce are described below.

Figure 2:
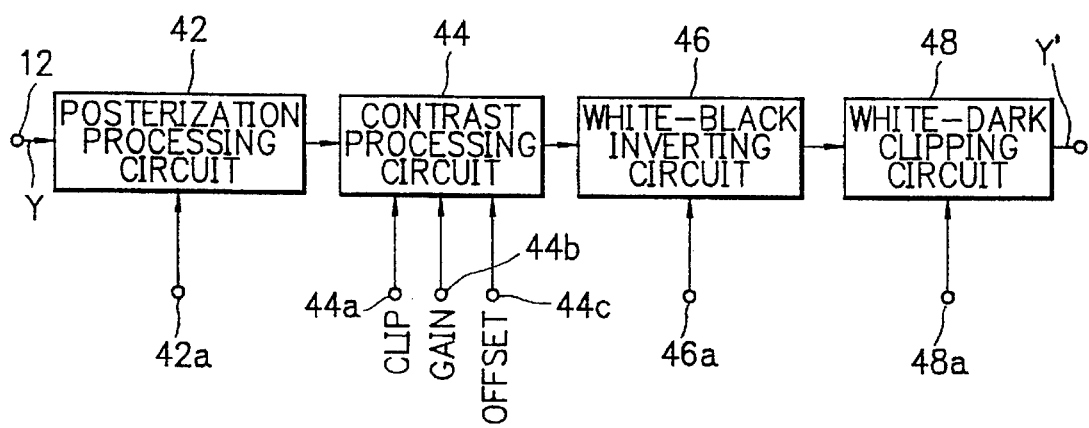
FIG. 2 is a schematic flow diagram of a typical luminance signal special effect processing circuit.

FIG. 2 is a schematic flow diagram of the luminance signal special effect processing circuit 14. The luminance signal Y input to the terminal 12 is forwarded to a posterization processing circuit 42 whereby gradation is reduced as needed.

Figure 3A:
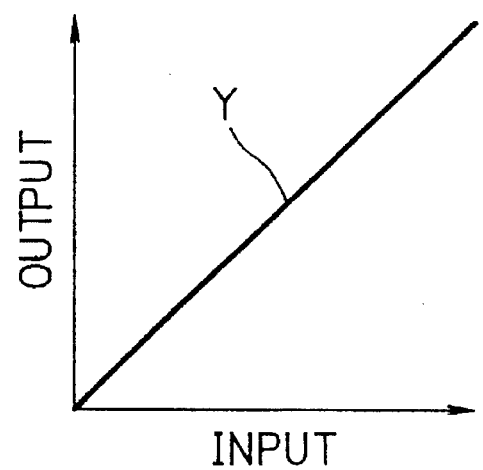
FIGS. 3A, 3B and 3C are views showing how posterization is performed.
Figure 3B:
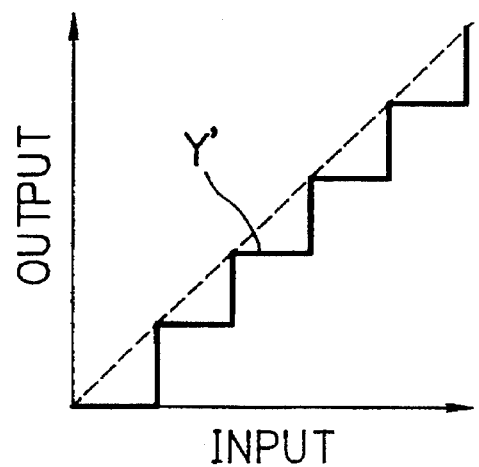
Figure 3C:
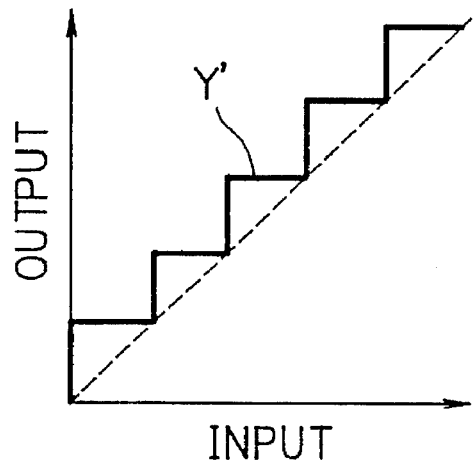

FIGS. 3A, 3B and 3C are views showing how posterization is performed. Illustratively, the linear I/O characteristic in FIG. 3A is converted to a nonlinear characteristic in FIG. 3B or 3C. This portrays how posterization is effected for gradation reduction. A terminal 42a of the posterization processing circuit 42 is supplied with special effect signal for controlling posterization.

Figure 4A:
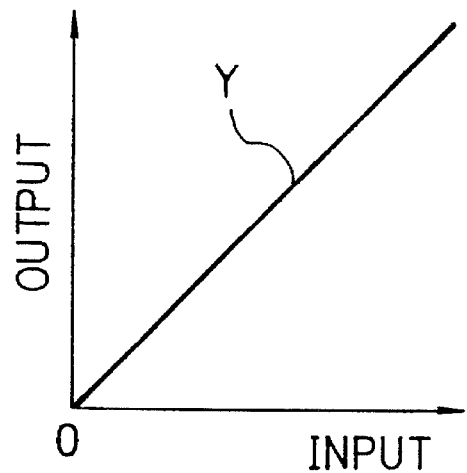
FIGS. 4A and 4B are views illustrating how offset adjustment is carried out.
Figure 4B:
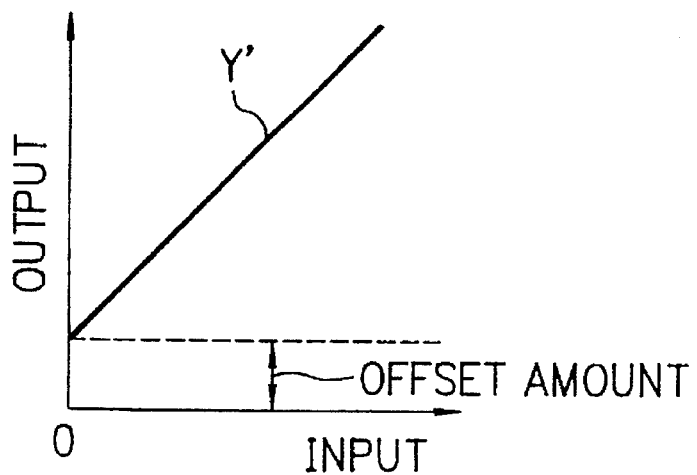
Figure 5:
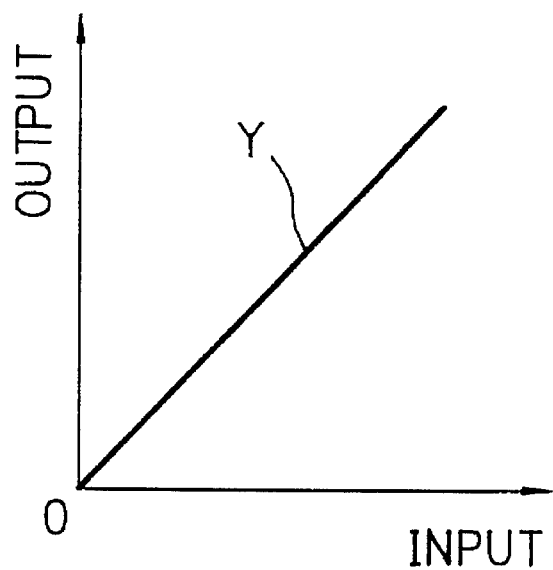
FIG. 5 is a view depicting how clock clipping is performed.
Figure 6:
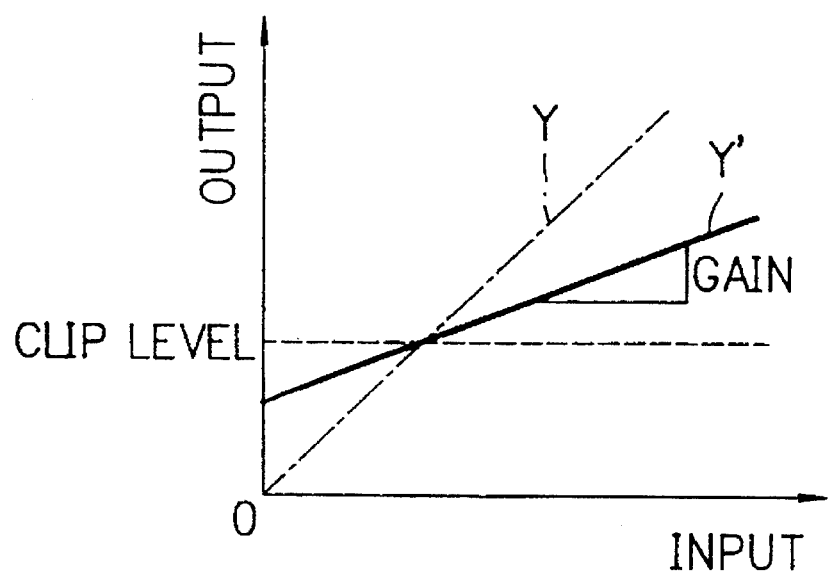
FIG. 6 is a view indicating how gain adjustment is conducted.

The posterized luminance signal is sent to a contrast processing circuit 44. The contrast processing for the input-ted luminance signal Y is, for example, an offset process or a clip-and-gain control process. FIG. 4A shows an input/output characteristic of the offset process when an offset value is 0. FIG. 4B shows an input/output characteristic when the offset process is performed with a specified offset value. The offset value is supplied as the special effect signal to a terminal 44c. FIG. 5 shows an input/output characteristic when the clip-and-gain control process is off. FIG. 6 shows an input/output characteristic when the clip-and-gain control process is on. The inclination (gain) of the processed luminance signal Y' is changed with respect to the clip level. The clip level and the gain is supplied as the special effect signals to terminals 44a and 44b, respectively.

A circuit 46 is a white-black inverting circuit. A terminal 48a of the circuit 46 is supplied with the special effect signal for controlling the white-black inverting process. When the special effect signal is 0, the white-black inverting circuit 46 outputs the inputted signal as is. When the special effect signal is 1, the white-black inverting circuit 46 outputs the white-black-inverted signal. A white-dark clipping circuit 48 has its terminal 48a fed with a special effect signal for controlling a white-dark clipping process.

As outlined, a number of special effect processes are carried out successively on the luminance signal Y. The signal leaving the circuit 48 is the luminance signal Y' having undergone the special effect processing. The special effect signal Ye is output to the circuit 14 from the special effect signal generation circuit 30.

Figure 7:
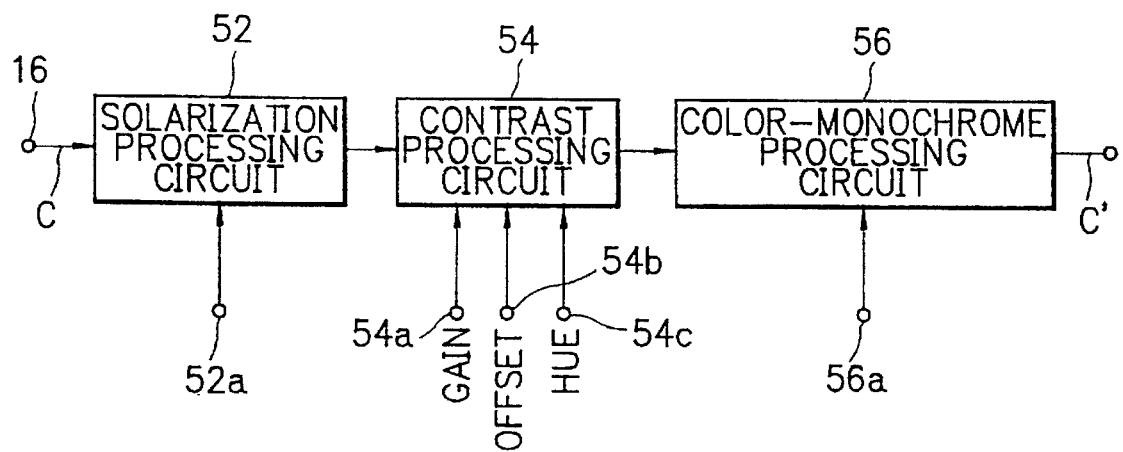
FIG. 7 is a schematic flow diagram of a typical chroma signal special effect processing circuit.

FIG. 7 is a schematic flow diagram of the chroma signal special effect processing circuit 20. As with its counterpart for the luminance signal, the chroma signal special effect processing circuit 20 includes a solarization processing circuit 52 for controlling the gradation of the chroma signal C. The circuit 20 also has a contrast processing circuit 54 for dealing with the chroma signal C.

The contrast processing on the chroma signal C involves adjusting the gain, offset and hue thereof. In some cases, a color-monochrome processing circuit 56 is also provided. The color-monochrome processing circuit 56 is used to select a color output or a monochrome output (the gain of the chroma signal is set to 0) of the chroma signal C'. Passing through the circuits 52, 54 and 56, the chroma signal eventually becomes the chroma signal C' following the special effect processing.

Terminals 52a, 54a, 54b, 54c and 56a are fed with the special effect signal Ce from the special effect signal generation circuit 30.

Figure 8:
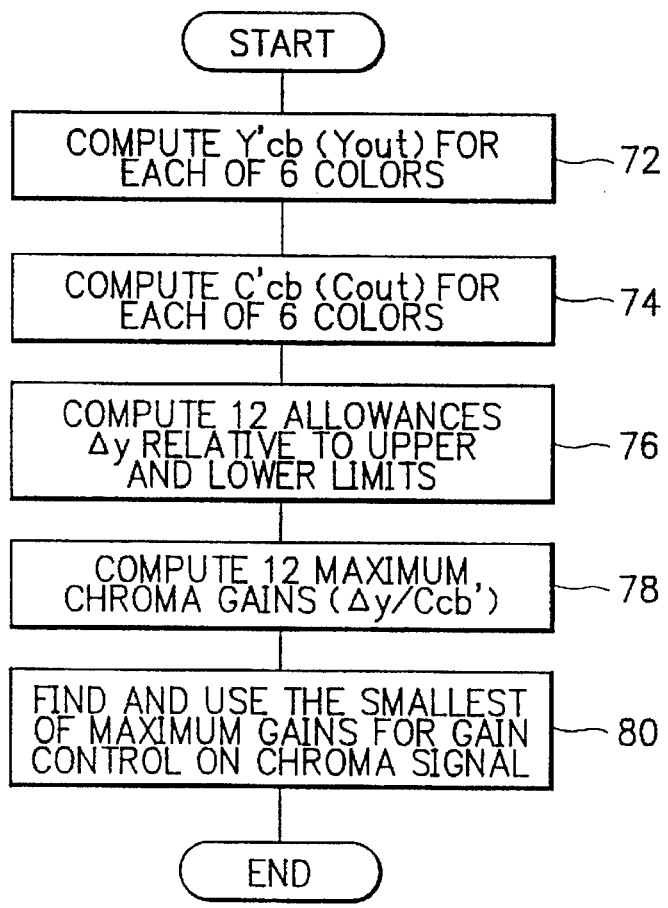
FIG. 8 is a flowchart of steps showing how estimate processing is illustratively performed.

Given the special effect signals Ye and Ce, the control unit 34 operates a built-in control program to estimate and suitably adjust the luminance signal Y' and the chroma signal C' following the special effect processing. FIG. 8 is a flowchart of steps showing how the control program performs the estimate appropriately.

The embodiment of the invention takes as reference a 100% color bar signal composed of a luminance signal Ycb and a chroma signal Ccb, and checks by estimate to see if these signals exceed any of their thresholds after undergoing special effect processing. FIG. 11A depicts a typical relationship between the luminance signal Ycb and chroma signal Ccb constituting the color bar signal.

As shown in FIG. 11A, whether or not the processed luminance signal Y', combined with the similarly processed chroma signal C' superimposed thereon, exceeds any threshold must be estimated for each of the component colors (6 colors including yellow and cyan) making up the superimposed chroma signal C' as shown in FIG. 11B. If any threshold is found to be exceeded for any one component color, the luminance signal Y' or chroma signal C' needs to be adjusted as shown in FIG. 11C.

The estimate is performed illustratively as follows: the level of a signal Ycb' after the special effect processing of the color bar luminance signal Ycb for each of the six colors is first computed (estimated), based on the special effect signal Ye (step 72). Likewise, the level of a signal Ccb' after the special effect processing of the color bar chroma signal Ccb is computed for each of the six color, based on the special effect signal Ce (step 74). Thereafter, differences $\Delta y(\Delta yu, \Delta yl)$ are respectively computed (step 78) between the estimated luminance signal Ycb' on the one hand, and the upper and lower limits on the other (i.e., allowances in effect before an illegal color is generated).

Thereafter, an operation $\Delta y \div Ccb'$ is performed on the basis of the 12 differences $\Delta y$ obtained. The resulting values, intended to keep the composite video signal from exceeding its upper and lower limits, are the maximum gains of the chroma signal (step 78). A total of 12 maximum values are acquired for the six colors. Of the 12 maximum values, the smallest is selected and used as the basis for gain control on the chroma signal Ccb' (step 80).

A specific example is described below. The example presupposes the following conditions:

(1) The clipping level Ly for the luminance signal Ycb is 0.5.

(2) The gain Gy of the luminance signal Ycb is 1.1.

(3) The offset value Oy of the luminance signal Ycb is 0.0.

(4) The posterization value Py is 0.0.

The posterization value being zero means no gradation applied, i.e., the processing being allowed to proceed in the state of FIG. 11A.

The special effect processing involves clipping, gain adjustment, offset adjustment and posterization, performed in that order. The luminance level at which a yellow chroma signal is superimposed on the color bar signal is estimated as follows:

(5) The luminance level Ycb is 0.886.

(6) The luminance signal Ycb' regarding the color yellow Ye is given as $$Ycb'=(Ycb-Ly)Gy+Ly+Oy\pm Py$$

By substituting relevant values for the respective terms, one gets:

$$Ycb'=0.925$$

The allowance $\Delta yu$ up to the upper limit Yu (=1.334) is given as $$\Delta yu=Yu-Ycb'=1.334-0.925=0.409$$

The allowance $\Delta yl$ down to the lower limit Yl (=−0.334) is given as $$\Delta yl=Ycb'-Yl=0.925+0.334=1.259$$

Meanwhile, because the chroma level Ccb of yellow in the color bar signal superimposed on the luminance signal Ycb' is ±0.447, the chroma gains for yellow are given as 0.409/0.447=0.915 (times)   upper limit side 1.259/0.447=2.817 (times)   lower limit side This means that an illegal color will occur if the chroma gain regarding yellow is not controlled to 0.915 times normal at the most.

The above-described chroma gain process is carried out on the upper and lower limit sides for each of the six component colors. When a total of 12 chroma gains are computed, the smallest of these gains is selected as the basis for controlling the gain of the chroma signal Ccb'. Where the smallest chroma gain is used as the reference for gain control, the composite video signal So does not take any value exceeding the upper limit value or dropping below the lower limit value at the worst.

Figure 9:
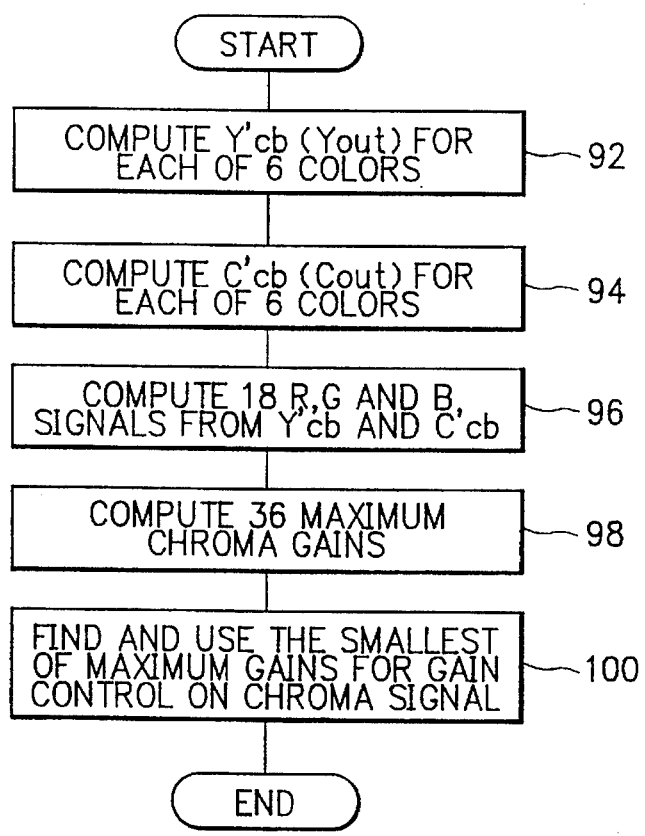
FIG. 9 is another flowchart of steps depicting how estimate processing is illustratively conducted.

FIG. 9 shows another flow chart showing how estimation is performed. The first two steps (92 and 94) parallel the flow chart of FIG. 8 (steps 72 and 74). Whereas the example of FIG. 8 adjusts the gains of the chroma signal C' by estimating the composite video signal following the special effect processing, it is also possible to compute primary color signals R, G and B from video signals having undergone the special effect processing (step 96) and then to find the chroma gains therefrom (steps 98, 100) as shown in FIG. 9. In the latter case, however, the computation must be carried out as many times as the number of the primary color signals involved (i.e., 36 times).

With the above embodiment, the gains of the chroma signal C' are controlled by estimating the composite video signal following the special effect processing or the R, G and B signals. Alternatively, the gains of the luminance signal Y' may be controlled for the same purpose. Another alternative is to have the gains of both the luminance signal Y' and the chroma signal C' controlled simultaneously.

As described, the video signal processing apparatus according to the invention estimates the level of the composite video signal following the special effect processing on the basis of special effect signals. The signals having undergone the special effect processing are controlled so that the level of the composite video signal will fall within a predetermined range of relevant requirements.

The invention prevents the level of the composite video signal from exceeding relevant threshold values because the processing is carried out with reference to a color bar signal. This scheme ensures the prevention of illegal color generation.

The level of the composite video signal is estimated on a software basis. This reduces the scale of circuitry in the control unit, whereby the external dimensions of the video signal processing apparatus are decreased and its costs are lowered as well.

It will be obvious to those having skill in the art that many changes may be made in the above-described details of the preferred embodiment of the present invention. The scope of the present invention, therefore, should be determined by the following claims.

What is claimed is:

1. A video signal processing apparatus, comprising:

luminance signal processing means for processing a luminance signal of a video signal;

chroma signal processing means for processing a chroma signal of said video signal;

control signal generation means for generating a control signal to control said luminance signal processing means and said chroma signal processing means;

level control means for controlling the level of said chroma signal processed by said chroma signal processing means; and control means receiving said control signal, for estimating signal levels of said luminance signal and said chroma signal which are processed by said luminance signal processing means and said chroma signal processing means respectively, based on said control signal, and for controlling said level control means, based on the estimated signal levels.

2. The video signal processing apparatus in accordance with claim 1, wherein said control means estimates said signal levels by calculation for the signal level of a color bar signal which is processed by said luminance signal processing means and said chroma signal processing means in accordance with said control signal.

3. The video signal processing apparatus in accordance with claim 1, wherein said control means controls said level control means so that the estimated level of a composite video signal made of said luminance signal and said chroma signal falls within a predetermined range.

4. The video signal processing apparatus in accordance with claim 1, wherein said control signal supplied to said chroma signal processing means includes an offset value.

5. The video signal processing apparatus in accordance with claim 1, wherein said control signal supplied to said chroma signal processing means includes a clip level and a gain.

6. A method for processing a video signal, comprising the steps of:

processing a luminance signal of a video signal;

processing a chroma signal of said video signal;

generating a control signal in order to control the process for said luminance signal and the process for said chroma signal;

controlling a level of the processed chroma signal;

estimating signal levels of said processed luminance signal and said processed chroma signal in accordance with said control signal; and controlling the process for controlling said level of the processed chroma signal in accordance with the estimated signal levels.

* * * * *